(12) United States Patent
Xue et al.

(10) Patent No.: US 11,775,277 B2
(45) Date of Patent: Oct. 3, 2023

(54) COMPUTER-IMPLEMENTED EXPOSOMIC CLASSIFIER

(71) Applicant: Microsoft Technology Licensing, LLC, Redmond, WA (US)

(72) Inventors: Xinjian Xue, Bothell, WA (US); Bin Pan, Bellevue, WA (US); Naveen Duddi Haribabu, Redmond, WA (US); Prashant Singh Ahluwalia, Redmond, WA (US); Ryan Wang Gao, Seattle, WA (US); Jong-Chin Lin, Bellevue, WA (US); Lea Vega Romero, Redmond, WA (US); Balaji Ramasubramaniam, Redmond, WA (US); Adeel Jamil Siddiqui, Redmond, WA (US); Onur Tuna, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 120 days.

(21) Appl. No.: 17/352,531

(22) Filed: Jun. 21, 2021

(65) Prior Publication Data

US 2022/0405077 A1    Dec. 22, 2022

(51) Int. Cl.
*G06F 8/65* (2018.01)
*G06F 9/455* (2018.01)
*G06F 11/34* (2006.01)

(52) U.S. Cl.
CPC ............ *G06F 8/65* (2013.01); *G06F 9/45558* (2013.01); *G06F 11/3452* (2013.01); *G06F 2009/45595* (2013.01)

(58) Field of Classification Search
CPC .... G06F 8/65; G06F 9/45558; G06F 11/3452; G06F 2009/45595
See application file for complete search history.

(56) References Cited

U.S. PATENT DOCUMENTS 9,195,566 B2 * 11/2015 Huang ................ G06F 11/3612
9,501,303 B1 * 11/2016 McBride ............. G06F 9/45558
(Continued)

FOREIGN PATENT DOCUMENTS

CA      3128957 A1 *  3/2020 ............. G06N 20/00
EP      3944505 A1 *  1/2022 ......... G06F 16/1744
(Continued)

OTHER PUBLICATIONS

Wu et al., "A model for inbound supply risk analysis", Jan. 2006, Elsevier B.V. (Year: 2006).*
(Continued)

*Primary Examiner* — Wei Y Zhen
*Assistant Examiner* — Junchun Wu
(74) *Attorney, Agent, or Firm* — CALFEE, HALTER & GRISWOLD LLP

(57) ABSTRACT

Technologies related to predicting whether a requested change (deployment) in a cloud computing environment will fail are described herein. An exposomic feature value is computed based upon a time series of risk values, where the risk values represent risk of failure over several historic time intervals. A probabilistic model computes a likelihood that the requested deployment will fail during implementation of the requested deployment based upon the exposomic feature value and a contextual feature value, and a notification is transmitted to a computing device of a change manager to allow the change manager to take remedial action.

20 Claims, 7 Drawing Sheets

(56) References Cited

U.S. PATENT DOCUMENTS

| | | | | |
|---|---|---|---|---|
| 9,654,599 | B1* | 5/2017 | Wheeler | G06F 9/4416 |
| 10,169,019 | B2* | 1/2019 | Dain | G06F 8/60 |
| 10,185,924 | B1* | 1/2019 | McClintock | H04L 63/1433 |
| 11,113,852 | B2* | 9/2021 | Garvey | G06F 18/2431 |
| 11,153,325 | B1* | 10/2021 | Igolnik | H04L 63/102 |
| 11,520,627 | B2* | 12/2022 | Liret | G06F 9/4881 |
| 2015/0052521 | A1* | 2/2015 | Raghu | G06F 9/4856 718/1 |
| 2015/0154012 | A1* | 6/2015 | Wolfram | G06F 8/75 717/176 |
| 2016/0139945 | A1* | 5/2016 | Griffith | G06F 3/067 718/1 |
| 2019/0373007 | A1* | 12/2019 | Salunke | G06F 11/3423 |
| 2019/0391866 | A1* | 12/2019 | Ampabathina | G06F 8/60 |
| 2020/0027210 | A1* | 1/2020 | Haemel | G06F 9/5038 |
| 2020/0125471 | A1* | 4/2020 | Garvey | G06F 18/217 |
| 2020/0162503 | A1* | 5/2020 | Shurtleff | G06F 9/451 |
| 2021/0034403 | A1* | 2/2021 | Yun | G06F 9/45558 |
| 2021/0406053 | A1* | 12/2021 | Mani | G06F 9/5072 |

FOREIGN PATENT DOCUMENTS

| | | | | |
|---|---|---|---|---|
| JP | 4992905 | B2* | 8/2012 | G06F 11/004 |
| WO | WO-2021104096 | A1* | 6/2021 | G06F 9/5083 |

OTHER PUBLICATIONS

Fawaz et al., "Deep learning for time series classification: a review", Mar. 2019, Springer (Year: 2019).*

Chen et al., "Fuzzy approaches to quality function deployment for new product design", 2008, Elsevier B.V. (Year: 2008).*

Kalia et al., "Unsupervised dimensionality reduction for exposome research", 2020, Elsevier B.V. (Year: 2020).*

"ITIL", Retrieved From: https://en.wikipedia.org/w/index.php?title=ITIL&oldid=935927780, Jan. 15, 2020, 29 Pages.

Altmann, et al., "Permutation Importance: A Corrected Feature Importance Measure", In Journal of Bioinformatics, vol. 26, Issue 10, Apr. 12, 2010, pp. 1340-1347.

Bae, et al., "A Two-Step Approach to Predictive Modeling of Individual-Based Environmental Health Risks", In Proceedings of the 34th ACM/SIGAPP Symposium on Applied Computing, Apr. 8, 2019, pp. 729-738.

Gouripeddi, et al., "An Architecture for Metadata-Driven Integration of Heterogeneous Sensor and Health Data for Translational Exposomic Research", In IEEE EMBS International Conference on Biomedical & Health Informatics (BHI), May 19, 2019, 4 Pages.

Kowsari, et al., "Text Classification Algorithms: A Survey", In Journal of Information, vol. 10, Issue 4, Apr. 23, 2019, pp. 1-68.

Ranjan, et al., "Dataset: Rare Event Classification in Multivariate Time Series", In Repository of arXiv:1809.10717v4, May 31, 2019, pp. 1-7.

Sakellarios, et al., "A Clinical Decision Support Platform for the Risk Stratification, Diagnosis, and Prediction of Coronary Artery Disease Evolution", In 40th Annual International Conference of the IEEE Engineering in Medicine and Biology Society (EMBC), Jul. 18, 2018, pp. 4556-4559.

"Logistic Regression", Retrieved From: https://en.wikipedia.org/wiki/Logistic_regression, Mar. 23, 2021, 23 Pages.

"Change Request", Retrieved From: https://en.wikipedia.org/wiki/Change_request, Apr. 7, 2020, 2 Pages.

"Naive Bayes Classifier", Retrieved From: https://en.wikipedia.org/wiki/Naive_Bayes_classifier, Apr. 12, 2021, 10 Pages.

"Multilayer Perceptron", Retrieved From: https://en.wikipedia.org/wiki/Multilayer_perceptron, Mar. 23, 2021, 4 Pages.

Aral, et al., "Learning Spatiotemporal Failure Dependencies for Resilient Edge Computing Services", In Journal of IEEE Transactions on Parallel and Distributed Systems, vol. 32, Issue 7, Jul. 1, 2021, pp. 1578-1590.

Kodell, et al., "On the Additive and Multiplicative Models of Relative Risk", In Journal of Biometrical, vol. 31, Issue 3, Jan. 1989, pp. 359-370.

"International Search Report and Written Opinion Issued in PCT Application No. PCT/US22/029082", dated Aug. 30, 2022, 12 Pages.

* cited by examiner

HISTORICAL DEPLOYMENTS DATA ⟵ 114

| DEPLOYMENT ID | TIME | LOCATION | ORG. | COMPONENT | SUBSCRIPTION | TYPE | CHANGE | SUCCESS |
|---|---|---|---|---|---|---|---|---|
| DEPLOYMENT 1 | TIME 1 | LOC. 1 | ORG. 1 | COMPONENT 1 | SUBS. 1 | TYPE 1 | CH. 1 | YES |
| ••• | | | | | | | | |
| DEPLOYMENT A | TIME B | LOC. C | ORG. D | COMPONENT E | SUBS. F | TYPE G | CH. H | NO |

FIG. 2

COMPUTER-IMPLEMENTED EXPOSOMIC CLASSIFIER

BACKGROUND

The information technology infrastructure library (ITIL) is a framework of best practices followed by information technology (IT) workers to facilitate delivery of high-quality IT services. The ITIL sets forth guidance with respect to change management, where change management is an IT service management discipline with an objective of ensuring that standardized methods and procedures are used for handling of changes made to an IT infrastructure in order to minimize the number and impact of any incidents related to service. The ITIL indicates that change management is composed of raising and recording of changes in a computing environment (where such changes are referred to herein as "deployments"), assessing the risk of deployments, managing and coordinating implementation of the deployments, monitoring and reporting on the implementations of the deployment, and reviewing and closing change requests.

In a cloud computing environment, where a cloud provider provides cloud-based services (e.g., on a public cloud and/or private cloud), change management is an arduous process, as there may be thousands to millions of deployments implemented in a single day. Examples of deployments include, but are not limited to, an update to an operating system of a virtual machine (VM) executing in a cloud environment, a fix of a software bug of an application executing in the cloud environment, a change in a network setting in the cloud environment, an update to hardware in the cloud environment, etc. A part of risk assessment in change management is ascertaining risk that a deployment will fail during implementation. In a commercial cloud, there are hundreds of thousands to millions of deployments every day; however, a relatively small number of those deployments fail during implementation. For instance, it has been observed that between 1% and 5% of all deployments in a commercial cloud fail during implementation, and therefore predicting that a deployment will fail during implementation is a rare event detection problem.

Typically, with respect to a requested deployment, IT personnel causes a request for the deployment to be surfaced to a change manager, where the change manager is tasked with performing risk assessment with respect to the requested deployment. Computer-implemented models have been developed to assist the change manager with this risk assessment. For instance, a conventional computer-implemented model is configured to receive values for contextual features of the requested deployment, wherein such features can include (but are not limited to) a location where the deployment is to be implemented, a description of the deployment (e.g., a type of the deployment), and so forth. Performance, however, of a conventional computer-implemented model that is configured to predict failures of deployments during implementation is suboptimal, due at least in part to the disparity between numbers of successful deployments and numbers of failed deployments. Put differently, when the conventional computer-implemented model is trained, there is a much larger number of training examples for successful deployments than there are training examples for failed deployments, which can result in suboptimal prediction of deployment failures using conventional features.

SUMMARY

The following is a brief summary of subject matter that is described in greater detail herein. This summary is not intended to be limiting as to the scope of the claims.

Described herein are various technologies pertaining to use of an exposomic classifier to predict whether or not a deployment will fail during implementation of the deployment. In contrast to conventional approaches for predicting a likelihood that a deployment will fail during implementation thereof, which rely solely upon contextual features (such as location, description, etc.), the technologies described herein employ environmental features when predicting whether a deployment will likely fail during implementation. An environmental feature is spatiotemporal in nature, and a value for an environmental feature is indicative of an environment in which the deployment is to be implemented.

As will be described in greater detail herein, a value for an environmental feature (also referred to herein as an exposomic feature) for a deployment is constructed by computing a time series for a parameter of the deployment. For instance, the deployment has an identity of a geographic region assigned thereto. A time series is constructed, where the time series has several non-overlapping intervals, and where an interval has a value assigned thereto that is indicative of a number of failed deployments at the location during the time interval relative to a total number of deployments at the location during the time interval. Therefore, a time series that comprises a sequence of values is constructed.

The time series is analyzed to identify anomalous values in the time series. There are numerous approaches for identifying anomalous values, including using a series decomposition algorithm, comparing values in the time series to a median value of the time series, comparing values in the time series to a mean value in the time series, etc. The value for the exposomic feature is based upon whether or not the value assigned to the last time interval in the time series has been identified as being anomalous. Put differently, and continuing with this example, an anomalous value for the last time interval in the time series indicates a greater risk that the deployment will fail when compared to when the last time interval does not have an anomalous value assigned thereto. Example exposomic features for which values can be computed include location assigned to the deployment, organization assigned to the deployment, subscription assigned to the deployment, and a hardware or software component assigned to the deployment, although other features are contemplated.

A probabilistic classifier is trained to output, for a requested deployment, a likelihood that the deployment will fail during implementation based upon at least one exposomic feature value and further based upon contextual feature values assigned to the deployment. Accordingly, when a change manager receives a request for a deployment, contextual and exposomic feature values for the requested deployment are provided to the probabilistic classifier, and the probabilistic classifier outputs a likelihood that the deployment will fail based upon the contextual and exposomic feature values. A notification can be provided to a computing device operated by the change manager, where the notification indicates to the change manager whether or not the requested deployment is likely to fail during implementation. When the notification indicates to the change manager that the requested deployment is likely to fail, the change manager can perform a remedial action. Use of values for exposomic features results in a probabilistic classifier that outperforms probabilistic classifiers that make predictions regarding deployment failures based solely upon contextual features (which are not spatiotemporal in nature).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a schematic that illustrates historical data pertaining to deployments and attempted deployments in a cloud computing environment.

DETAILED DESCRIPTION

Figure 1:
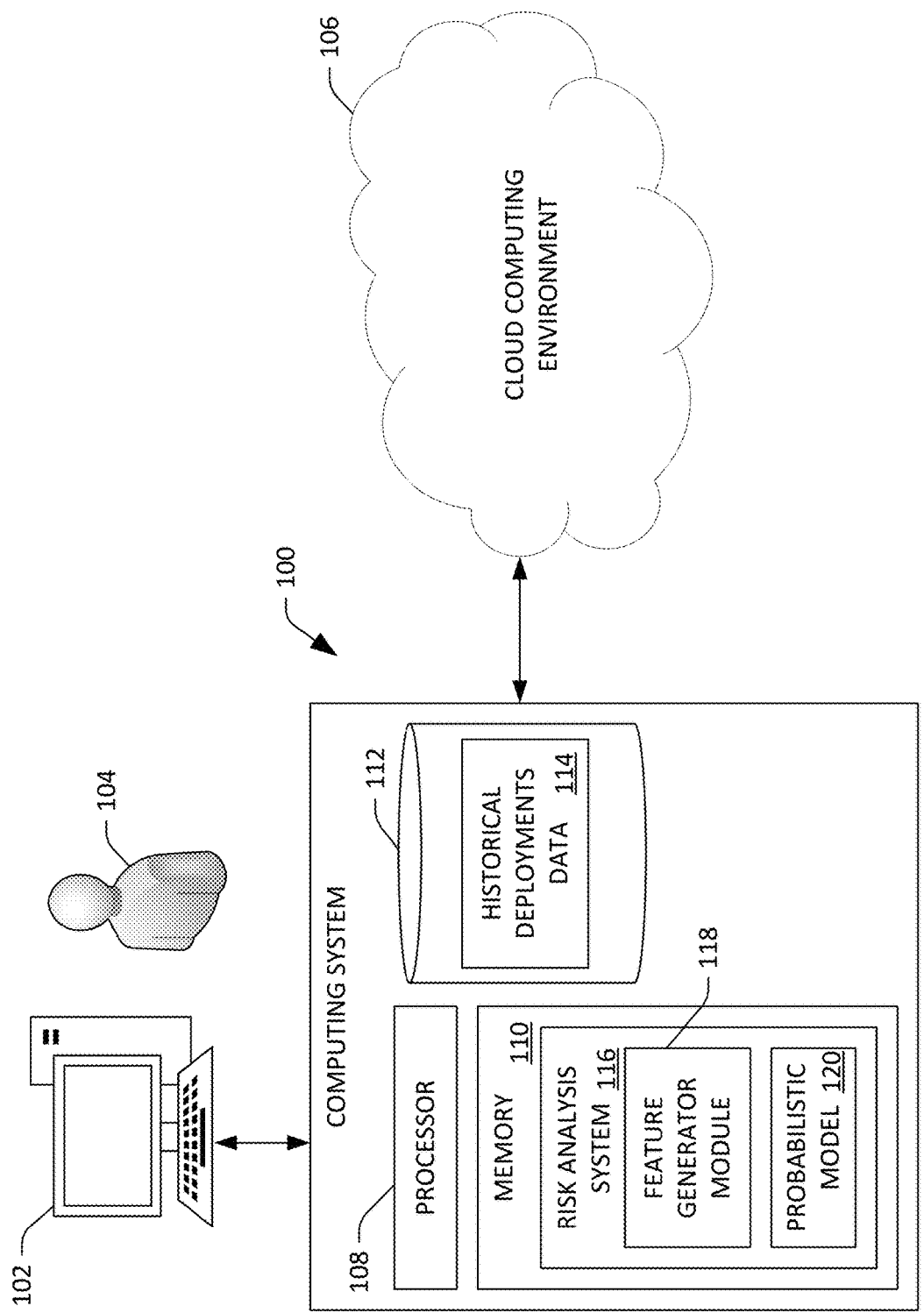
FIG. 1 is a functional block diagram of a computing system that is configured to predict a likelihood that a requested deployment in a cloud computing environment will fail during implementation of the deployment.

Various technologies pertaining to employment exposomic features in connection with predicting an outcome in a computing environment (such as predicting whether a requested deployment will fail during implementation of the deployment) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Referring now to FIG. 1, a functional block diagram of a computing system 100 that is configured to predict whether a requested deployment for a cloud computing environment will fail during implementation of the deployment is illustrated. The requested deployment may be an update (e.g., monthly update) to an operating system for a virtual machine (VM) in a cloud computing environment, a software fix for an operating system of a VM in the cloud computing environment, an update to hardware in the cloud computing environment, a change to a network setting in the cloud computing environment, amongst several other potential deployments.

The computing system 100 is in communication with a computing device 102 operated by a change manager 104, where the change manager 104 is tasked with performing risk assessment with respect to requested deployments for a cloud computing environment 106. The computing system 100 is in communication with the cloud computing environment 106, where the cloud computing environment 106 includes hardware and software for providing cloud-based services. Thus, the cloud computing environment 106 includes edge routers, switches, data storage devices, compute nodes, etc., which operate in conjunction to provide cloud computing services. The cloud computing environment 106 can include computing and/or storage resources at different geographic locations, can have computing and/or storage resources that are allocated to different organizations in an enterprise that manages the cloud computing environment 106, may include computing and/or storage resources that are assigned different software and/or hardware components that are used in a cloud computing environment 106 to provide computing and/or storage services, may include computing and/or storage resources assigned to different service subscriptions in the cloud computing environment 106, may include computing and/or storage resources assigned to certain clients of the cloud computing environment 106, etc. It is also to be understood that the cloud computing environment 106 can be or include a public cloud, a private cloud, or both.

While the computing system 100 is illustrated as being separate from the cloud computing environment 106, it is to be understood that the computing system 100 may be considered to be within the cloud computing the environment 106. The computing system 100 includes a processor 108 and memory 110, where the memory 110 includes instructions that are executed by the processor 108. The computing system 100 further includes a data store 112 that retains historical deployments data 114 for the cloud computing environment 106.

Information that may be included in the historical deployments data 114 can include an identifier for a deployment, a description of the deployment, a location where the deployment was implemented (or attempted to be implemented), a time when the deployment was implemented (or attempted to be implemented), an indication as to whether the deployment was successful or failed, amongst other information.

As will be described below, the historical deployments data 114 is employed to construct environmental feature values (referred to as exposomic feature values) for a requested deployment.

The memory 110 includes a risk analysis system 116 that is configured to predict whether a deployment that is requested to be implemented in the cloud computing environment 106 will fail during implementation of such deployment. The risk analysis system 116 includes a feature generator module 118 that is configured to construct values for exposomic features based upon values of parameters of a requested deployment and data in the historical deployments data 114. As will be described in greater detail herein, the exposomic features are spatiotemporal features and are constructed by the feature generator module 118 based upon a time series of risk values. In an example, a requested deployment may have a particular location (from amongst several possible locations in the cloud computing environment 106) assigned thereto as a parameter, where the location may be a geographic location, an identity of a data center where the requested deployment is to be implemented, etc. Based upon the location, the feature generator module 118 can construct a time series for the location, where the time series covers a time window, and further where the time series corresponds to several nonoverlapping time intervals in the time window.

Continuing with this example, the feature generator module 118 computes a risk value for each time interval, where the risk value for a time interval is based upon a number of deployments for the cloud computing environment 106 with the location assigned thereto that failed during implementation during the time interval relative to a total number of deployments for the cloud computing environment 106 with the location assigned thereto that were successfully implemented during the time interval. The value for the exposomic feature is based upon such time series. In a specific example, the feature generator module 118 can analyze the time series and identify risk values therein that are anomalous relative to other risk values in the time series. When the feature generator module 118 identifies that the risk value for the last (most recent) time interval in the time series is anomalous, the feature generator module 118 can output a first value for the exposomic feature. Contrarily, when the feature generator module 118 identifies that the risk value for the last (most recent) time interval in the time series is not anomalous, the feature generator module 118 can output a second value for the exposomic feature that is different from the first value.

Pursuant to an example, the feature generator module 118 generates values for several different exposomic features, where each value for each exposomic feature is based upon a time series computed for a respective parameter (e.g., location, component, subscription, and organization). Further, the feature generator module 118 can aggregate the values for the exposomic features to construct an aggregated (final) exposomic feature value for the requested deployment.

The risk analysis system 116 further includes a probabilistic model 120 that is configured to receive at least one exposomic feature value (e.g., the final exposomic feature value, an exposomic feature value for a particular parameter or parameters, etc.) generated by the feature generator module 118, and is further configured to compute (probabilistically) a likelihood that the requested deployment will fail during implementation. The probabilistic model 120 can also take as input contextual feature values that are not spatiotemporal oral in nature, such as values for location, type of the requested deployment, amongst other features.

In operation, the computing system 100 receives a deployment request, where the deployment request may be received from the computing device 102 operated by the change manager 104 or from some other computing device operated by IT personnel who is requesting the deployment with respect to the cloud computing environment 106. The requested deployment has values for parameters assigned thereto, where the parameters include, but are not limited to, deployment description, deployment location, deployment organization, deployment component, deployment subscription, deployment change parent, amongst other parameters. The feature generator module 118, based upon a value of a parameter of the requested deployment, retrieves historical deployment data from the historical deployments data 114, where the retrieved historical deployments data includes entries for several historical deployments, where the entries: 1) have timestamps assigned thereto within a predefined time window, such as one week; 2) have the value of the parameter (e.g., the same location as the deployment) assigned thereto; and 3) have values assigned thereto that indicate whether the deployments succeeded or failed during implementation of the deployments.

The feature generator module 118 construct a time series of risk values based upon the retrieved historical deployments data, as described above. The feature generator module 118 generates an exposomic feature value based upon the constructed time series. The probabilistic model 120 is provided with the exposomic feature value (and other feature values corresponding to the requested deployment). Based upon feature values provided thereto, the probabilistic model 120 outputs a likelihood that the requested deployment will fail when implemented in the cloud computing environment 106. Based upon such likelihood, the computing system 100 can cause an alert to be transmitted to the computing device 102 operated by the change manager 104. When the notification indicates that the deployment is predicted to fail during implementation, the change manager 104 can perform some remedial action with respect to the requested deployment. When the notification indicates that the requested deployment is likely to succeed, the change manager 104, through interaction with the computing device 102, can approve the requested deployment, and the deployment can be implemented in the cloud computing environment 106.

The technologies described above exhibit advantages over conventional approaches for risk assessment with respect to requested deployments in the cloud computing environment 116. The risk analysis system 116 generates more accurate predictions with respect to whether a requested deployment will fail during implementation in the cloud computing environment 106 when compared to conventional approaches. This improvement can be attributed to the use of exposomic feature values by the probabilistic model 118 when computing likelihoods that requested deployments will fail.

Additional detail with respect to the probabilistic model 120 is now set forth. The probabilistic model 120 can be a binary probabilistic classifier that assigns a class label ŷ to a sample x, where the probabilistic model 120 assigns the class label based on conditional distributions $P_r(X|Y)$, such that for a given $x \in X$, the probabilistic model 120 assigns probabilities to all $y \in Y$. The probabilistic model 120 assigns the predicted class to x that has the highest probability:

$$\hat{y} = \arg\max_y P_r(Y=y|X). \quad (1)$$

The probabilistic model 120 can be any suitable probabilistic model, such as, but not limited to, naive Bayes, a logistic regression model, a multiclass perceptron (MLP) model, a deep neural network (DNN), a recurrent neural network (RNN), etc.

When the probabilistic model 120 is a binary classifier, $Y=[0,1]$ and $\Sigma P_r(y)=1$. In this example, class 0 is the majority (e.g., there is a low risk of failure of the deployment during implementation) and 1 the minority (e.g., there is a high risk of failure of the deployment during implementation). The probabilistic model 120 is an exposomic model, and thus the sample vector X is composed of two sub-vectors, $X=[X_e,X_c]$. $X_e$ includes the feature values extracted from the spatial and temporal properties of the environment within which the deployment is to be implemented (i.e., $X_e$ represents the exposomic features). $X_c$ includes the contextual feature values that are conventionally employed in probabilistic models.

The probabilistic model 120 can be trained based upon contextual feature values and exposomic feature values for observed deployments in the cloud computing environment 106. Exemplary contextual features available for deployments in the cloud computing environment 106 include, but are not limited to, status (which notes whether the deployment succeeded or failed during implementation), description (which describes the deployment, such as type of deployment), component (which specifies a software service in the cloud computing environment 106 with respect to which the deployment pertained and/or hardware infrastructure in the cloud computing environment 106 where the deployment has taken place), change (which includes information about a specific deployment stage for a deployment), change parent (the parent of the stage assigned to the deployment), location (which specifies a region or data center where the deployment was implemented or attempted to be implemented), organization (which specifies the organization responsible for the deployment in the cloud computing environment 106), subscription (which specifies a subscription for a client in the cloud computing environment 106 assigned to the deployment), etc. It is to be understood that the probabilistic model 120 may be trained based upon values for the above-mentioned contextual features and/or other contextual features.

Exposomic features are environmental features related to the contextual features organization, subscription, location, and component, which have been described above. Unlike the contextual features, the exposomic features are based upon time series for such features, an example of which will be provided below with respect to a requested deployment.

Referring now to FIG. 2, an example of the historical deployments data 114 is illustrated. The historical deployments data 114 can include an entry for each deployment implemented and attempted to be implemented in the cloud computing environment 106 over some window of time, such as one week, one month, etc. As noted above, each entry may include a deployment ID that identifies the deployment, a time when the deployment was implemented or attempted to be implemented, a location where the deployment was implemented or attempted to be implemented, an organization assigned to the deployment, a component assigned to the deployment, a subscription assigned to the deployment, a description of the deployment (e.g., a type of the deployment), a change assigned to the deployment (which indicates a deployment stage for the deployment), and an indication as to whether the deployment was successful or not successful during implementation. Each deployment entry may also include other parameter values which have been referenced above.

Figure 3:
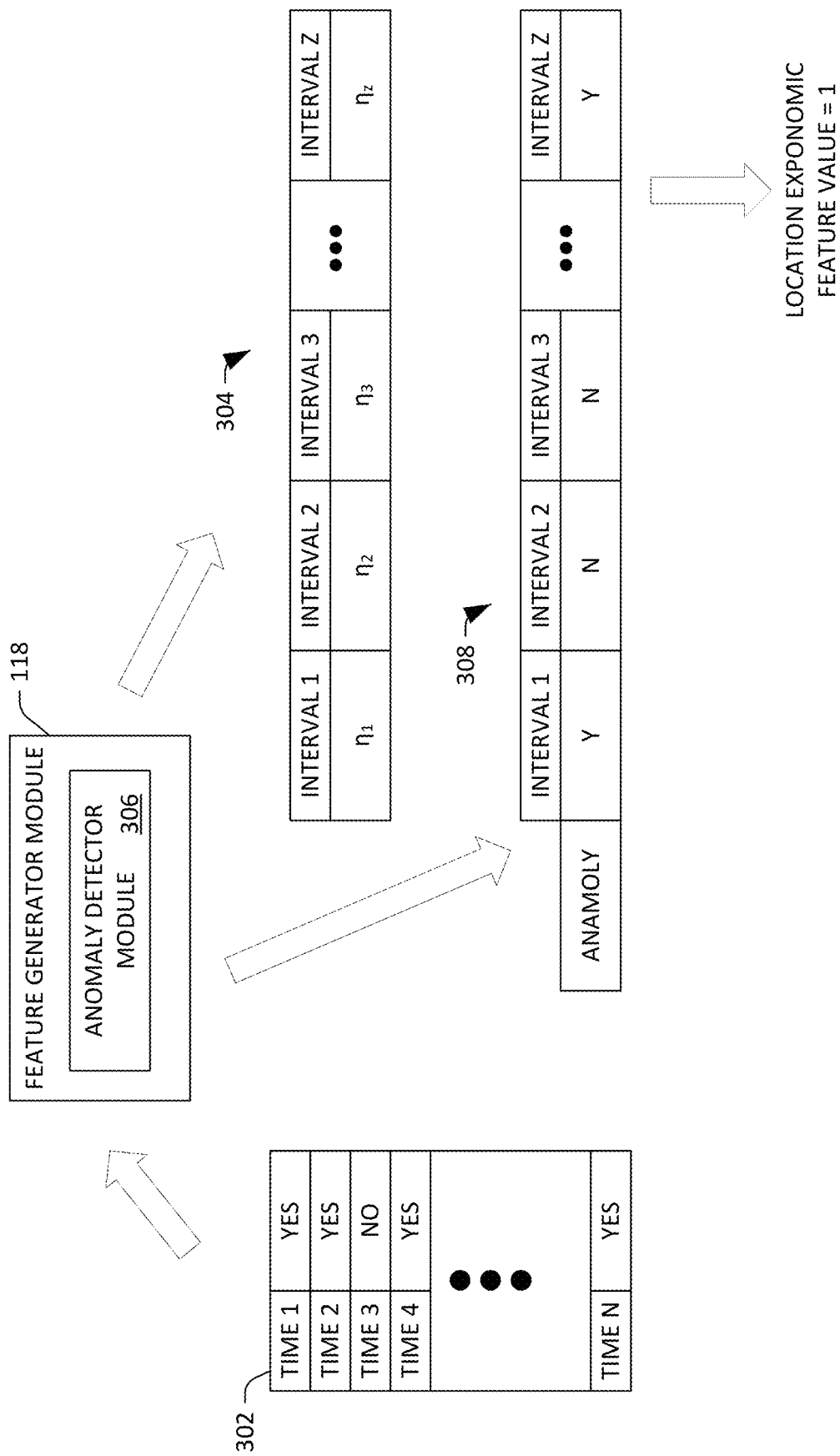
FIG. 3 is a functional block diagram that depicts construction of an exposomic feature value.

FIG. 3 depicts construction of an exposomic feature value for a location of a requested deployment. The computing system 100 receives a deployment request, where the deployment request has a value "location C" assigned to the parameter "location". The risk analysis system 118 receives the request, and the feature generator module 118 retrieves entries from the historical deployments data 114 that have the following parameter values: 1) "location C"; and 2) time values within a time window (e.g., within the last week). As illustrated in table 302, the feature generator module 118 extracts the following values from the retrieved entries: 1) time values from such entries; and 2) indications as to whether the deployments that correspond to the entries succeeded or failed during implementation in the cloud computing environment 106.

Based upon the information in the table 302, the feature generator module 118 constructs a time series of risk values 304 for the location identified in the deployment request ("location C"). The risk values are assigned to time intervals in the time window based upon the times assigned to the entries, where a risk value assigned to a time interval is representative of a number of deployments that failed during implementation during the time interval relative to a total number of deployments implemented or attempted to be implemented during the time interval. In the example shown in FIG. 3, there are Z time intervals and thus Z risk values in the time series of risk values 304, with risk value $N_Z$ being the risk value assigned to the last time interval in the time series.

The feature generator module 118 also includes an anomaly detector module 306. The anomaly detector module 306 receives the time series of risk values 304 and, based upon the risk values in the time series, identifies, for each risk value, whether the risk value is anomalous in the time series 304 of risk values 304. The anomaly detector module 306 can employ any suitable approach for determining when a risk value is anomalous in a time series. For instance, the anomaly detector module 306 can remove seasonality and trend from a baseline established in the time series, and can employ a series decomposition algorithm to detect anomalies in the time series 304. For instance, the anomalies can be detected beyond k-value. In another example, the anomaly detector module 306 can compute a medium or mean of the risk values in the time series 304 and can label risks values that are a threshold amount above the median or mean as being anomalous. Hence, the anomaly detector module 306 can output a vector of values 308 that correspond to the time intervals, were each valued indicates whether or not the risk value for the time series is anomalous.

The feature generator module 118 can then set a value for the exposomic feature based upon whether or not the risk value ($\eta_z$) that corresponds to the last time interval in the time series has been identified as being anomalous. In the example shown in FIG. 3, the vector 308 indicates that $\eta_z$ is anomalous (thereby indicating that, in the current computing environment of the cloud computing environment 106 at location C, there is a higher than normal risk that deployments will fail during implementation). Continuing with this example, the feature generator module 118 outputs an exposomic feature value (e.g., one) based upon $\eta_z$ being identified as anomalous. It is to be understood that the exposomic feature about value may be binary in nature (e.g., 0 or 1). In another example, the exposomic feature value is within some range, where the exposomic feature value is representative of how anomalous $\eta_z$ is relative to other risk values in the time series 304. Therefore, the exposomic feature value may be a value between 0 and 1, with 1 indicating that $\eta_z$ is highly anomalous in the time series 304 and 0 indicating that $\eta_z$ is not at all anomalous in the time series 304.

The feature generator module 118 can compute exposomic feature values for several different parameters of a requested deployment, including location, organization, subscription, and component. The feature generator module 118 can undertake similar processing to compute each of such exposomic feature values. Further, in an example, the feature generator module 118 constructs a single, final exposomic feature value that is based upon several different exposomic feature values corresponding to the different parameters of the received deployment request.

Additional detail pertaining to the feature generator module 118 is now set forth. As illustrated in the historical deployments data 114, each deployment, occurring at time t, is associated with one or more parameters, such as a specific organization, subscription, location, and component. Hence, a received deployment request belongs to four separate cohorts (organization, subscription, location, and component). $C^f$ and $C^s$ represent failed and successful deployments, respectively, in time interval $\tau=[t-\delta,t]$, $\delta>0$, and $C^f \cap C^s = \emptyset$ and $C^f \cup C^s = C$. Thus, the rate of failed deployments (e.g., the risk of a cohort) can be represented as follows:

$$\eta = \frac{|C^f|}{|C|} \quad (2)$$

Risks of cohorts may be additive or multiplicative, and risk of an individual deployment is proportional to the risk of the cohort to which the deployment belongs.

The feature generator module 118 can calculate $\eta_i$ for $i=0, \ldots, n$ for the time interval $\tau_i=[t_i, t_{i+1}]$, and thus the feature generator module 118 can generate the time series $\Theta = [\eta_0, \ldots, \eta_n]$, which represents the risk of a cohort. The feature generator module 118 can compute $\Theta^j$, $j=1, \ldots, 4$ for the four separate cohorts.

The anomaly detector module 306 detects anomalies in each of the time series computed for each of the cohorts. Anomalies in the last time interval, denoted as $\Gamma_n^j$, are of interest because information corresponding to the last time interval constitutes system health signals. In other words, the exposomic feature can be formulated as Boolean variables:

$$X_e = [x_e^1, \ldots, x_e^4], \text{ and } x_e^j = \begin{cases} 0, \text{ if } \nexists \Gamma_n^j \\ 1, \text{ if } \exists \Gamma_n^j \end{cases}, j=1, \ldots, 4 \quad (3)$$

The risks of the cohorts can be treated as additive, and in such situation, the feature generator module 118 can form $X_e$ as follows:

$$X_e = [x_e], \text{ where } x_e = \begin{cases} \text{Severe, if } \sum_j \Gamma_n^j = 4 \\ \text{Major, if } \sum_j \Gamma_n^j = 3 \\ \text{Moderate, if } \sum_j \Gamma_n^j = 2 \\ \text{Minor, if } \sum_j \Gamma_n^j = 1 \\ \text{Normal, if } \sum_j \Gamma_n^j = 0 \end{cases} \quad (4)$$

As described previously, the probabilistic model 120 is trained based upon exposomic feature values, and can compute a likelihood that a requested deployment will fail during implementation in the cloud computing environment 106 based upon an exposomic feature value for the requested deployment (as well as contextual feature values for the requested deployment). When the change manager 104 receives an indication that the requested deployment is likely to fail, the change manager 104 can perform a remedial action with respect to the requested deployment.

Figure 4:
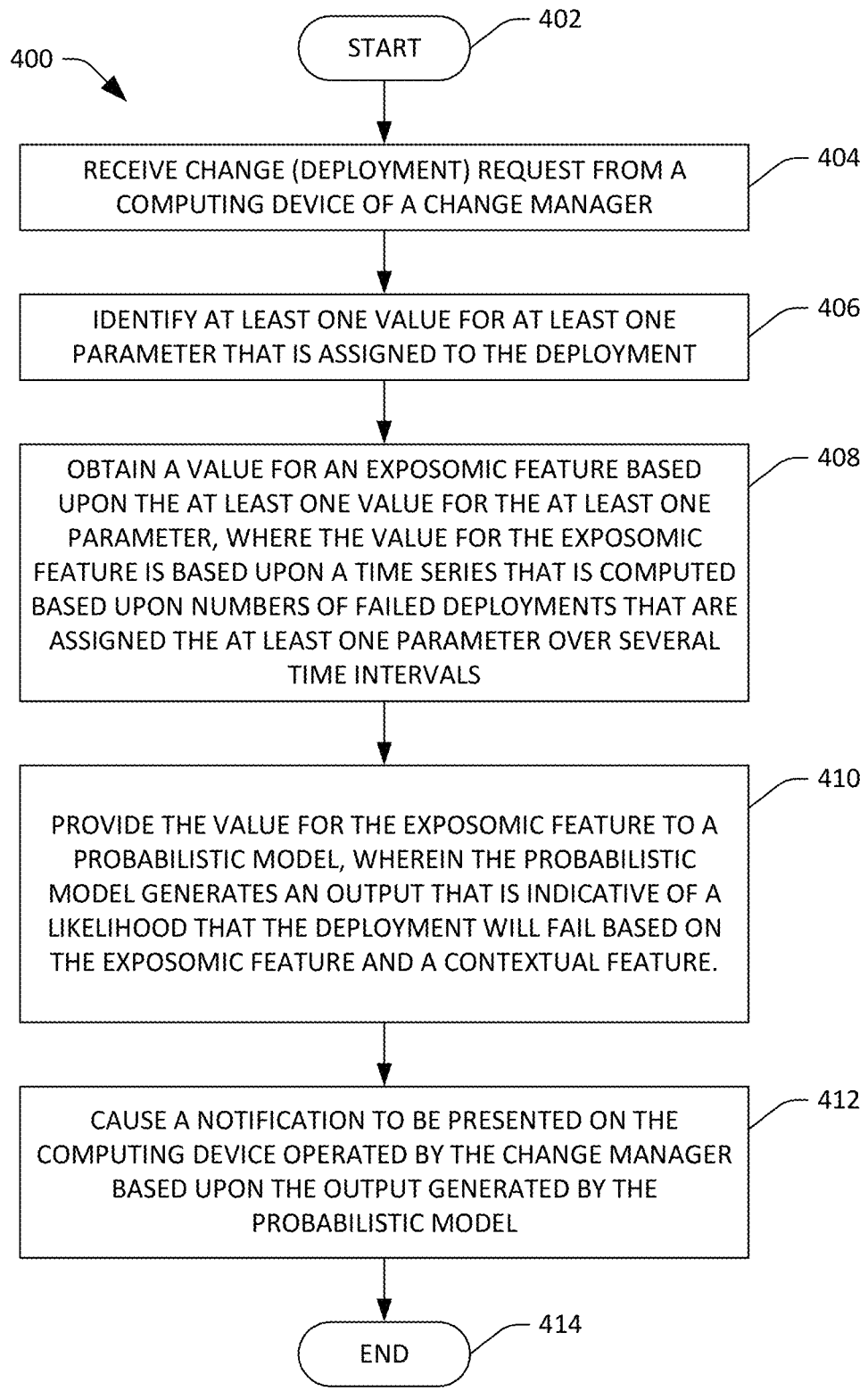
FIG. 4 is a flow diagram illustrating a methodology for notifying a change manager as to whether a requested deployment for a cloud computing environment is predicted to fail during implementation of the deployment.
Figure 5:
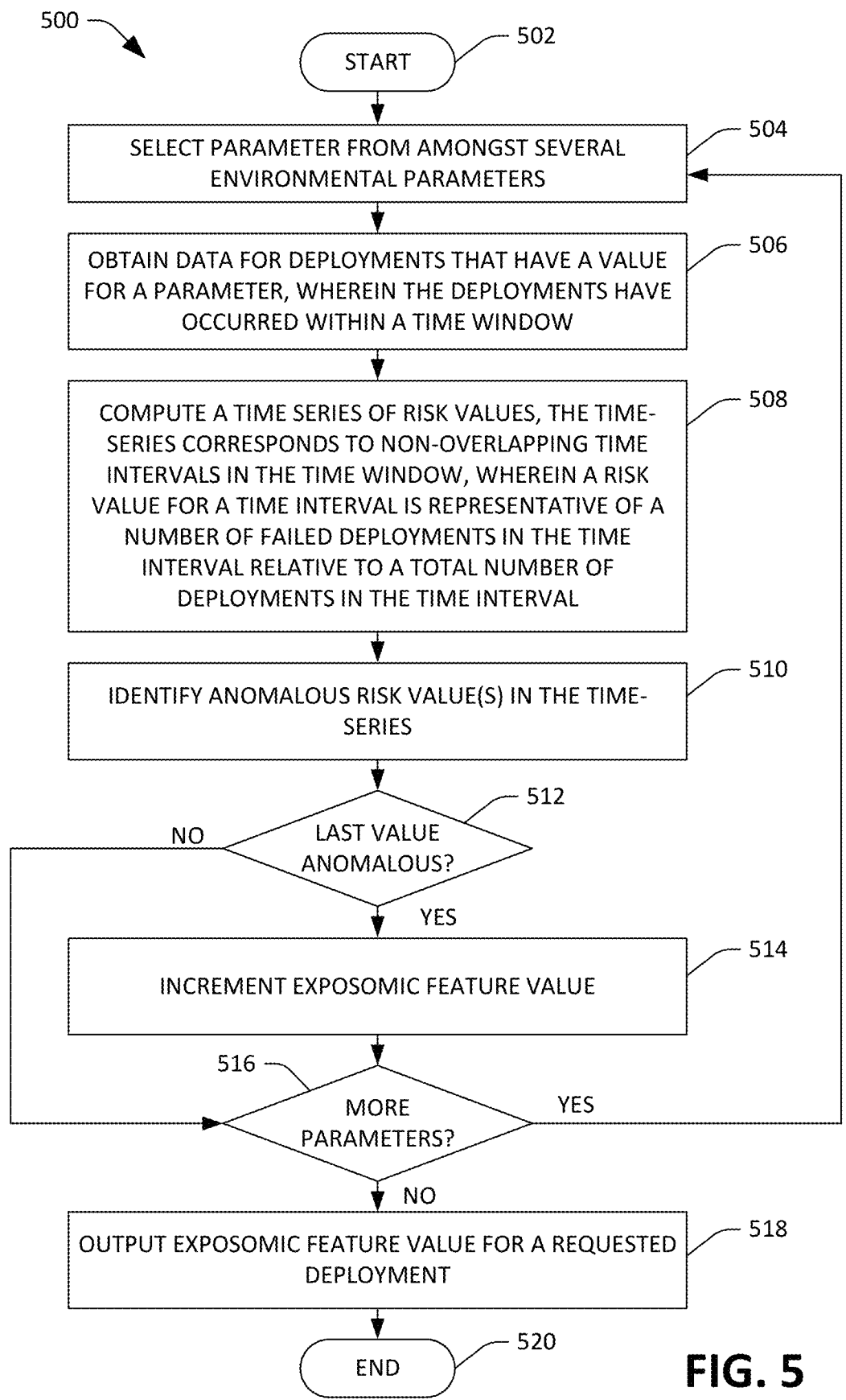
FIG. 5 is a flow diagram illustrating a methodology for constructing an exposomic feature value for use in connection with predicting whether a requested deployment for a cloud computing environment will fail during implementation of the deployment.

FIGS. 4 and 5 illustrate methodologies relating to predicting whether a requested deployment in a cloud computing environment will fail during implementation. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now solely to FIG. 4, a flow diagram depicting a methodology 400 for predicting a likelihood that a requested deployment will fail when implemented in a cloud computing environment is illustrated. The methodology 400 starts at 402, and at 404 a change (deployment) request is received from a computing device operated by a change manager. In an alternative embodiment, the change request may be received from some other IT personnel. At 406, at least one parameter value that is assigned to the deployment is identified based upon the request. For instance, a location that is assigned to the deployment can be determined at 406. At 408, a value for an exposomic feature is obtained based upon the value for the at least one parameter that is assigned to the deployment. As mentioned previously, the value for the exposomic feature is based upon a time series that is computed based upon numbers (and/or rates) of failed deployments that are assigned to the at least one parameter over several time intervals. Put differently, the time series is computed based upon a number of previously implemented deployments in the cloud computing environment that were implemented at the location and that failed or succeeded during their implementation.

At 410, the value for the exposomic feature is provided to a probabilistic model. The probabilistic model generates an output that is indicative of a likelihood that the deployment will fail when implemented in the cloud computing environment. In addition, the probabilistic model generates the output based upon the value for the exposomic feature (and further based upon one or more contextual features). At 412, a notification is caused be presented on the computing device operated by the change manager based upon the output generated by the probabilistic model, where the notification indicates that the deployment is likely to fail when implemented in the cloud computing environment. The methodology for hundred completes at 414.

With reference now to FIG. 5, a flow diagram illustrating a methodology 500 for computing an exposomic feature value with respect to a deployment request is illustrated. The methodology 500 starts at 502, and at 504 a parameter from amongst several environmental parameters that are assigned to deployments is selected. As discussed previously, the parameters may be location, organization, subscription, and component. For instance, the selected parameter is location.

At 506, data for historic deployments implemented in a cloud computing environment are obtained, where the data have a predefined value for the selected parameter. For example, times that the historic deployments were implemented or attempted to be implemented as well as indications as to whether the deployments were successful or failed during implementation can be obtained. Moreover, the historic deployments were implemented or attempted to be implemented within a predefined time window (e.g., within the last week).

At 508, a time series of risk values is computed, where the time series corresponds to nonoverlapping time intervals in the time window. A risk value for a time interval is representative of a number of failed deployments in the time interval relative to a total number of deployments in the time interval, where both the failed deployments and total deployments have the same value for the parameter as the requested deployment.

At 510, anomalous risk values are identified in the time series. At 512, a determination is made as to whether the last value in the time series is anomalous. When it is determined at 512 that the last value in the time series is anomalous, the methodology 500 proceeds to 514, where an exposomic feature value is incremented.

When at 512 it is determined that the last value is not anomalous or subsequent to 514, at 516 a determination is made as to whether there are more parameters to consider (e.g., whether component, subscription, and/or organization remained to be considered). When it is determined at 516 that there are more parameters to consider, the methodology 500 returns to 504, where a next parameter is selected. When it is determined at 516 that there are no more parameters to consider, the methodology 500 proceeds to 518, where the exposomic feature value is output for the requested deployment. The methodology 500 completes at 520.

Figure 6:
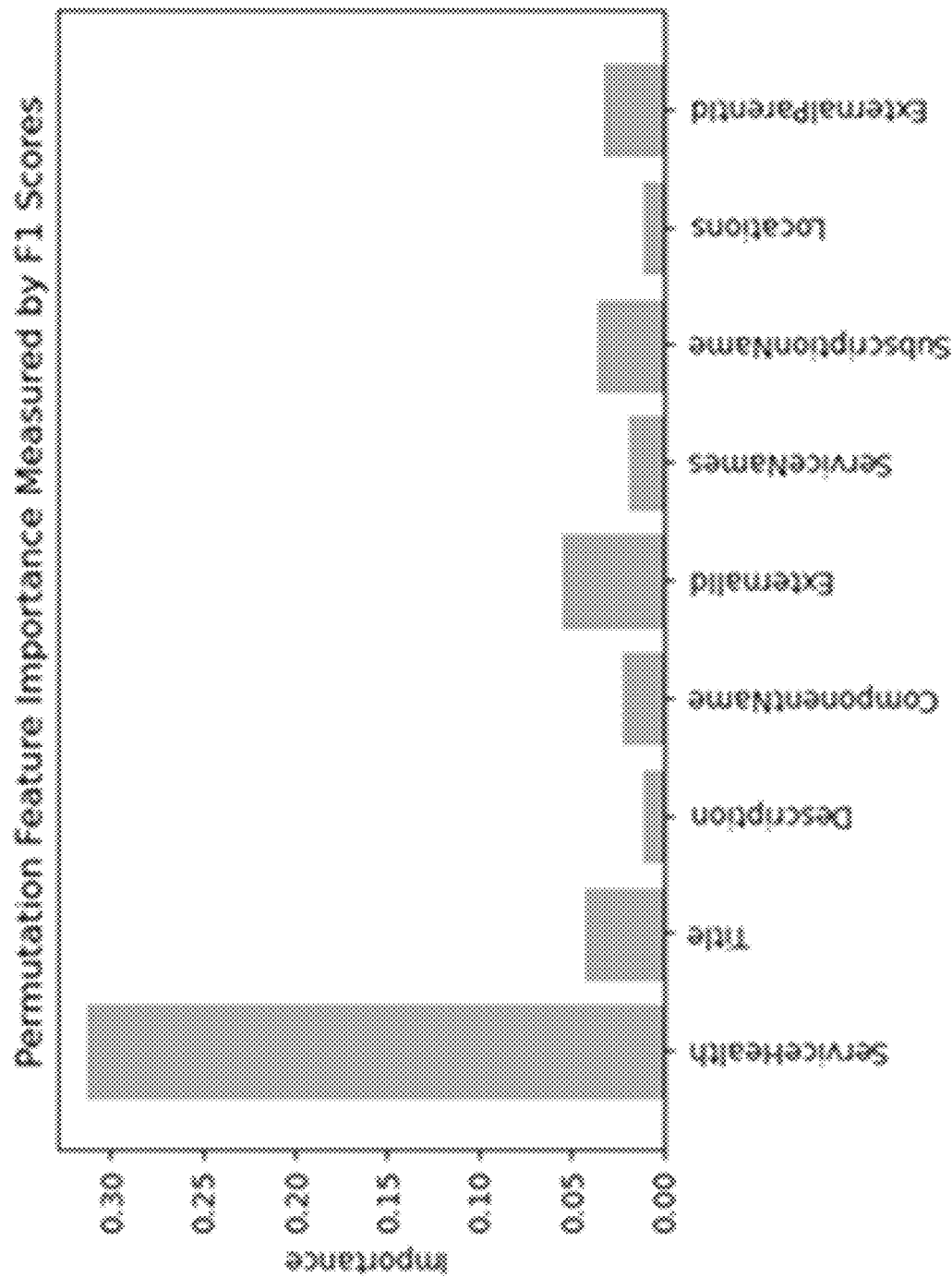
FIG. 6 is a chart that depicts influence of exposomic feature values in connection with predicting whether a requested deployment in a cloud computing environment will fail during implementation of the deployment.

FIG. 6 is a plot 600 that depicts importance of the exposomic features for predicting likelihood of failure of a requested deployment relative to other features. With more particularly, in an example, exposomic features were tested by using a time window of seven days, and thus n=7× 24=168. Results demonstrate that use of the exposomic features results in significantly improving performance of a classifier. For instance, using the formula of the Permutation Feature Importance and measuring F1 score for feature j, the importance of feature j can be measured as follows.

$$I_j = s - \frac{1}{K}\sum_{k=1}^{K} s_{k,j} \qquad (5)$$

Here, s is the full feature score, and $s_{k,j}$ is a score without feature j. To obtain a representative feature importance value, this process is run K times. FIG. 6 shows the exposomic feature, ServiceHealth, corresponding to $X_e$, contributes most to accuracy of the model from amongst all considered features.

In addition, model performance when considering exposomic feature values was measured. Table 1, depicted below, lists model performance measured by the average of precision, recall, and F1 score of the minority class, after months running against a production data stream (e.g., millions of different deployments). It can be concluded from content of Table 1 that the model performed optimally when four separate exposomic feature values were aggregated (full environmental feature), but that the model with any consideration of exposomic feature values is an improvement over models that considered contextual features alone.

TABLE 1

| Model Performance Indicators With and Without Environmental Features | | | |
|---|---|---|---|
| | Precision | Recall | F1 Score |
| Full environmental feature | 0.6024 | 0.4915 | 0.5404 |
| Partial environmental feature | 0.5472 | 0.4332 | 0.4835 |
| Without environmental feature | 0.4989 | 0.2414 | 0.3254 |

While the description above has focused on employing exposomic features values to compute a likelihood that a requested deployment will fail during implementation, it is contemplated that other outcomes related to cloud computing can be predicted using probabilistic models that take exposomic feature values as input. For instance, exposomic feature values can be employed to predict whether a client of the cloud computing environment will use compute resources allocated to the client over some window of time. In another example, exposomic feature values can be employed to predict a likelihood of a service outage corresponding to the cloud computing environment 106. Other examples will be readily understood by one skilled in the art.

Figure 7:
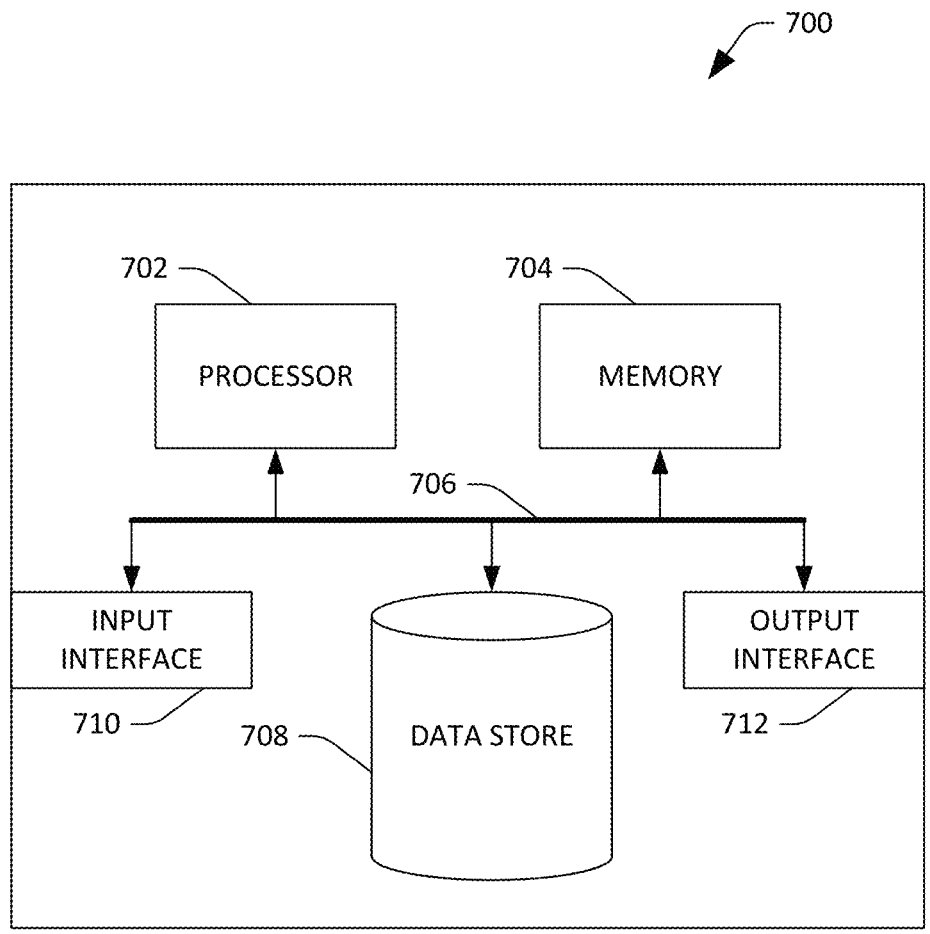
FIG. 7 is an example computing system.

Referring now to FIG. 7, a high-level illustration of a computing device 700 that can be used in accordance with the systems and methodologies disclosed herein is illustrated. For instance, the computing device 700 may be used in a system that is configured to predict a likelihood that a requested deployment will fail. By way of another example, the computing device 700 can be used in a system that is configured to generate an exposomic feature value. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store exposomic feature values, contextual feature values, etc.

The computing device 700 additionally includes a data store 708 that is accessible by the processor 702 by way of the system bus 706. The data store 708 may include executable instructions, historical deployments data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

The features described herein relate to employing an exposomic model to predict likelihoods that deployments in a cloud computing environment will fail according to at least the examples provided below.

(A1) In one aspect, some embodiments include a computer-implemented method performed by a processor of a computing device. The computer-implemented method includes receiving a request for a deployment in a cloud computing environment, wherein the request is received from a computing device operated by a change manager. The method also includes obtaining data for the deployment in response to receiving the request, where the data for the deployment comprises a value for an exposomic feature, wherein the exposomic feature is computed based upon a time series for at least one parameter of the deployment. The method further includes based upon the obtained data, and through use of a probabilistic model, computing a likelihood that the deployment will fail during implementation of the deployment. In addition, the method includes based upon the computed likelihood that the deployment will fail during implementation of the deployment, causing a notification to be displayed on the computing device of the change manager who issued the request.

(A2) In some embodiments of the method of (A1), the deployment is an update to an operating system of a virtual machine (VM) hosted in the cloud computing environment.

(A3) In some embodiments of the method of A1, the deployment is a bug fix for software that is installed on a computing device in the cloud computing environment.

(A4) In some embodiments of the method of A1, the deployment is an alteration to hardware in the cloud computing device.

(A5) In some embodiments of any of the methods of A1-A4, the exposomic feature is based upon a number of deployment failures that have the at least one parameter assigned thereto relative to a total number of deployments that have the at least one parameter assigned thereto, wherein the deployment failures and the total number of deployments were implemented or attempted to be implemented within a time window.

(A6) In some embodiments of the method of A5, the time series includes, for several non-overlapping time intervals, numbers of deployment failures that have the at least one parameter relative to total numbers of deployments that have the at least one parameter.

(A7) In some embodiments of the method of A6, the at least one parameter comprises an organization for the cloud computing environment from amongst several organizations for the cloud computing environment, where the organization is assigned to the deployment.

(A8) In some embodiments of any of the methods of A6-A7, the at least one parameter comprises a location in the cloud computing environment from amongst several locations in the cloud computing environment, where the deployment is to be implemented at the location.

(A9) In some embodiments of any of the methods of A6-A8, the at least one parameter comprises a subscription assigned to the deployment from amongst several possible subscriptions.

(A10) In some embodiments of the any of the methods of A6-A9, the at least one parameter comprises a software module assigned to the deployment from amongst several possible software modules.

(A11) In some embodiments of any of the methods of A1-A10, obtaining the data for the deployment includes: a) computing the time series for the at least one parameter, wherein the time-series comprises, for time intervals in the time-series, respective values for risk, wherein the values for risk are computed based upon numbers of failed deployments that have the at least one parameter associated therewith relative to a total number of deployments that have the at least one parameter associated therewith; and b) determining whether a value in the time series in a most recent time interval is anomalous, wherein the value for the exposomic feature is based upon whether the value in the time-series in the most recent time interval is anomalous.

(B1) In another aspect, some embodiments include a method for notifying a change manager in a cloud computing environment that a deployment requested by the change manager is likely to fail. The method includes receiving, from a computing device operated by the change manager, a request for the deployment. The method also includes based upon the request, identifying at least one parameter that is assigned to the deployment. The method further includes obtaining a value for an exposomic feature based upon the at least one parameter that is assigned to the deployment, wherein the value for the exposomic feature is based upon a time series that is computed based upon numbers of failed deployments that have the value of the at least one parameter over several time intervals. The method additionally includes providing the value for the exposomic feature and a value for a contextual feature to a probabilistic model, wherein the probabilistic model generates an output that is indicative of a likelihood that the deployment will fail, and further wherein the probabilistic model generates the output based upon the value for the exposomic feature and value for the contextual feature. The method also includes causing a notification to be presented on the computing device operated by the change manager based upon the output generated by the probabilistic model, wherein the notification indicates that the deployment is likely to fail.

(B2) In some embodiments of the method of B1, the probabilistic model is a naïve Bayesian model.

(B3) In some embodiments of the method of B1, the probabilistic model is a multilayer perceptron model.

(B4) In some embodiments of the method of B1, the probabilistic model is a logistic regression model.

(B5) In some embodiments of any of the methods of B1-B4, obtaining the value for the exposomic feature comprises: a) computing risk values for respective non-overlapping time intervals over a window of time, wherein each risk value for a respective time interval is based upon a number of deployments with the at least one parameter assigned thereto that failed during the time interval relative to a total number of deployments during the time interval; and b)

identifying that a risk value for the last time interval is anomalous relative to other risk values for other time intervals in the time intervals, wherein the value for the exposomic feature is based upon the risk value for the last time interval being anomalous relative to the other risk values for the other time intervals.

(B6) In some embodiments of the method of B5, the at least one parameter comprises location assigned to the deployment, an organization within the cloud environment assigned to the deployment, a component within the cloud environment assigned to the deployment, and a subscription in the cloud environment assigned to the deployment.

(B7) In some embodiments of any of the methods of B1-B6, the deployment is an update to an operating system of a virtual machine (VM) hosted in the cloud computing environment.

(B8) In some embodiments of any of the methods of B1-B6, the deployment is a fix of a software bug in the cloud computing environment.

(C1) In another aspect, some embodiments include a computing system that comprises a processor and memory, where the memory stores instructions that, when executed by the processor, cause the processor to perform any of the methods disclosed herein (e.g., any of the methods of A1-A11 and/or B1-B8).

(D1) In yet another aspect, some embodiments include a computer-readable storage medium that, when executed by a processor, cause the processor to perform any of the methods disclosed herein (e.g., any of the methods of A1-A11 and/or B1-B8).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
   receiving a request for a deployment in a cloud computing environment, wherein the request is received from a computing device operated by a change manager;
   obtaining data for the deployment in response to receiving the request, where the data for the deployment comprises a value for an exposomic feature, wherein the value for the exposomic feature is computed based upon a time series for at least one parameter of the deployment, and further wherein obtaining data for the deployment comprises:
      computing the time series for the at least one parameter, wherein the time-series comprises, for time intervals in the time-series, respective values for risk, wherein the values for risk are computed based upon numbers of failed deployments that have the at least one parameter associated therewith relative to a total number of deployments that have the at least one parameter associated therewith; and
      determining whether a value in the time series in a most recent time interval is anomalous, wherein the value for the exposomic feature is based upon whether the value in the time-series in the most recent time interval is anomalous;
   based upon the obtained data, and through use of a probabilistic model, computing a likelihood that the deployment will fail during implementation of the deployment; and
   based upon the computed likelihood that the deployment will fail during implementation of the deployment, causing a notification to be displayed on the computing device of the change manager who issued the request.

2. The computing system of claim 1, wherein the deployment is an update to an operating system of a virtual machine (VM) hosted in the cloud computing environment.

3. The computing system of claim 1, wherein the deployment is a bug fix for software that is installed on a computing device in the cloud computing environment.

4. The computing system of claim 1, wherein the deployment is an alteration to hardware in the cloud computing device.

5. The computing system of claim 1, wherein the exposomic feature is based upon a number of deployment failures that have the at least one parameter assigned thereto relative to a total number of deployments that have the at least one parameter assigned thereto, and further wherein the deployment failures and the total number of deployments were implemented or attempted to be implemented within a time window.

6. The computing system of claim 5, wherein the time series includes, for several non-overlapping time intervals, numbers of deployment failures that have the at least one parameter relative to total numbers of deployments that have the at least one parameter.

7. The computing system of claim 6, where the at least one parameter comprises an organization for the cloud computing environment from amongst several organizations for the cloud computing environment, where the organization is assigned to the deployment.

8. The computing system of claim 6, where the at least one parameter comprises a location in the cloud computing environment from amongst several locations in the cloud computing environment, where the deployment is to be implemented at the location.

9. The computing system of claim 6, where the at least one parameter comprises a subscription assigned to the deployment from amongst several possible subscriptions.

10. The computing system of claim 6, where the at least one parameter comprises a software module assigned to the deployment from amongst several possible software modules.

11. A method for notifying a change manager in a cloud computing environment that a deployment requested by the change manager is likely to fail, the method comprising:
receiving, from a computing device operated by the change manager, a request for the deployment;
based upon the request, identifying at least one parameter that is assigned to the deployment;
obtaining a value for an exposomic feature based upon the at least one parameter that is assigned to the deployment, wherein the value for the exposomic feature is based upon a time series that is computed based upon numbers of failed deployments that have the value of the at least one parameter over several time intervals, and further wherein obtaining the value for the exposomic feature comprises:
computing risk values for respective non-overlapping time intervals over a window of time, wherein each risk value for a respective time interval is based upon a number of deployments with the at least one parameter assigned thereto that failed during the time interval relative to a total number of deployments during the time interval; and
identifying that a risk value for the last time interval is anomalous relative to other risk values for other time intervals in the time intervals, wherein the value for the exposomic feature is based upon the risk value for the last time interval being anomalous relative to the other risk values for the other time intervals;
providing the value for the exposomic feature and a value for a contextual feature to a probabilistic model, wherein the probabilistic model generates an output that is indicative of a likelihood that the deployment will fail, and further wherein the probabilistic model generates the output based upon the value for the exposomic feature and the value for the contextual feature; and
causing a notification to be presented on the computing device operated by the change manager based upon the output generated by the probabilistic model, wherein the notification indicates that the deployment is likely to fail.

12. The method of claim 11, wherein the probabilistic model is a naïve Bayesian model.

13. The method of claim 11, wherein the probabilistic model is a multilayer perceptron model.

14. The method of claim 11, wherein the probabilistic model is a logistic regression model.

15. The method of claim 11, wherein the at least one parameter comprises location assigned to the deployment, an organization within the cloud environment assigned to the deployment, a component within the cloud environment assigned to the deployment, and a subscription in the cloud environment assigned to the deployment.

16. The method of claim 11, wherein the deployment is an update to an operating system of a virtual machine (VM) hosted in the cloud computing environment.

17. The method of claim 11, wherein the deployment is a fix of a software bug in the cloud computing environment.

18. A computer-readable storage medium comprising instructions that, when executed by a processor, cause the processor to perform acts comprising:
receiving a request for a deployment in a cloud computing environment, wherein the request is received from a computing device operated by a change manager;
obtaining data for the deployment in response to receiving the request, where the data for the deployment comprises a value for an exposomic feature, wherein the exposomic feature is computed based upon a time series for at least one parameter of the deployment;
based upon the obtained data, and through use of a probabilistic model, computing a likelihood that the deployment will fail during implementation of the deployment in the cloud computing environment, and further wherein obtaining data for the deployment comprises:
computing the time series for the at least one parameter, wherein the time-series comprises, for time intervals in the time-series, respective values for risk, wherein the values for risk are computed based upon numbers of failed deployments that have the at least one parameter associated therewith relative to a total number of deployments that have the at least one parameter associated therewith; and
determining whether a value in the time series in a most recent time interval is anomalous, wherein the value for the exposomic feature is based upon whether the value in the time-series in the most recent time interval is anomalous; and
based upon the computed likelihood that the deployment will fail during implementation of the deployment, causing a notification to be displayed on the computing device of the change manager.

19. The computer-readable storage medium of claim 18, wherein the deployment is an update to an operating system of a virtual machine (VM) hosted in the cloud computing environment.

20. The computer-readable storage medium of claim 18, wherein the deployment is a bug fix for software that is installed on a computing device in the cloud computing environment.

* * * * *